United States Patent [19]

Nagata

[11] 4,236,155
[45] Nov. 25, 1980

[54] LIQUID CRYSTAL DISPLAY DEVICE

[75] Inventor: Mitsuo Nagata, Suwa, Japan

[73] Assignee: Kabushiki Kaisha Suwa Seikosha, Tokyo, Japan

[21] Appl. No.: 962,747

[22] Filed: Nov. 21, 1978

[30] Foreign Application Priority Data

Nov. 22, 1977 [JP] Japan .............................. 52-140457
Dec. 15, 1977 [JP] Japan .............................. 52-150973

[51] Int. Cl.³ .............................................. G06F 3/14
[52] U.S. Cl. .................................. 340/784; 340/713;
340/765; 340/805; 350/331 R; 350/346
[58] Field of Search ................ 350/331, 332, 346;
340/784, 765, 713, 805

[56] References Cited

U.S. PATENT DOCUMENTS

| | | | |
|---|---|---|---|
| 3,703,331 | 11/1972 | Goldmacher et al. | 350/346 |
| 3,857,629 | 12/1974 | Freiser | 350/346 |
| 4,009,934 | 3/1977 | Goodwin et al. | 350/346 |
| 4,119,558 | 10/1978 | Coates et al. | 350/346 |
| 4,119,842 | 10/1978 | Hayden et al. | 350/346 |

*Primary Examiner*—Marshall M. Curtis
*Attorney, Agent, or Firm*—Blum, Kaplan, Friedman, Silberman & Beran

[57] ABSTRACT

A liquid crystal display device suitable for a matrix display of a large number of lines of picture cells can nevertheless provide high contrast. The liquid crystal material used in the device is suitable for operating in the twisted nematic mode and has a dielectric anisotropy which is positive at low frequency and negative at high frequency. A timing signal is provided to the picture cell, the timing signal comprising a high frequency component and a low frequency component such that the dielectric anisotropies of the liquid crystal are at least nearly equal and opposite in sign. In addition a data signal is supplied, said data signal being equal in frequency to one or the other of the components in the timing signal. The signals are utilized in driving the display by suitable matrix-addressing.

6 Claims, 6 Drawing Figures

LIQUID CRYSTAL DISPLAY DEVICE

BACKGROUND OF THE INVENTION

The use of liquid crystal materials in matrix displays has received considerable attention. In general, the use of alternating current is preferred because of the fact that there is no net transfer of charge so that oxidation and reduction reactions are avoided. U.S. Pat. No. 3,575,492 discloses the use of alternating current in combination with nematic liquid crystal elements for increasing the speed of erasure of the display, a frequency in the range between 2 and 20 KHz being cited. U.S. Pat. No. 3,740,717 describes multiplexed operation of a plurality of liquid crystal numeric indicators in which a plurality of alternating exciting voltages are used. An operating principle based on change in the sign of the dielectric anisotropy of a liquid crystal material with change in frequency is described by B. Dargent et al in a paper "Twisted Nematic Flat-Panel Display" published in the April, 1977 issue of the Society For Information Display International Symposium, Digest of Technical Papers. The liquid crystal material used was ZLI 518 manufactured by Merck. A low frequency signal was used to turn the display on and a high frequency signal was used to turn it off.

While these papers disclose the use of more than one frequency in a matrix display as well as a knowledge and means of utilizing the change in dielectric anisotropy of the liquid crystal display material with frequency, nevertheless, these papers do not teach a means of coping with the problem of presenting a display in which the number of lines is large, such displays commonly suffering from low contrast. This problem is not solved by the multiplex driving method now being used, said method being termed the generalized AC amplitude selective multiplexing method. As is evident then, the improvement over the conventional method of matrix-addressing is strongly to be desired.

SUMMARY OF THE INVENTION

A liquid crystal display device utilizes a liquid crystal material the dielectric anisotropy of which varies with the frequency of imposed alternating current. At a frequency below a critical frequency the dielectric anisotropy is positive and at a frequency above said critical frequency the dielectric anisotropy is negative. To operate the device, two different frequencies are used, one being below the critical frequency and the other above, the two frequencies chosen being such that the ratio $$|\Delta \epsilon fH / \Delta \epsilon fL|,$$

is sufficiently close to 1 to provide high contrast, the numerator and the denominator of said ratio being the absolute values of the changes in said dielectric anisotropy corresponding respectively to the higher frequency and the lower frequency.

The liquid crystal material may be an essentially pure composition consisting essentially of liquid crystals suitable for operating in the twisted nematic mode or may comprise such a liquid crystal material having dissolved therein a dichroic dye in a guest-host relationship.

Both of the frequencies are provided to the matrix display in a timing signal, either the high or the low frequency signal being used to place an element of the display in the selected condition, that is, the on condition, and the other frequency being used to place the display in the non-selected condition, that is, in the off condition. Also, a data signal corresponding in frequency to one of the two frequencies in the timing signal is also provided, said data signal being either in phase with or 180° out-of-phase with said corresponding frequency and being subtracted therefrom.

The combination of the dichroic dye with the nematic liquid crystal in guest-host relationship is suitable for use in the present invention regardless of which of the two frequencies is used for selecting the on condition of a display element. However, it is preferably used where the high frequency is applied in the selected condition because of the fact that this combination provides a colored display, that is, the selected elements of the display are shown in color.

Preferably, both the low-frequency and the high-frequency signals are rectangular in shape.

Accordingly, it is an object of the present invention to provide a liquid crystal display driven by a two-frequency matrix-addressing system wherein the number of lines in the system can be large without adversely affecting the contrast of the system.

Another object of the present invention is a liquid crystal display driven by a two-frequency matrix-addressing system wherein a nematic liquid crystal material having a dielectric anisotropy which is positive at one of said frequencies and negative at the other of said frequencies is employed.

A further object of the invention is a liquid crystal display driven by a two-frequency matrix-addressing system wherein said frequencies are such that the dielectric anisotropy of the liquid crystal material is negative for one of said frequencies and is positive for the other of said frequencies.

An important object of the present invention is a liquid crystal display driven by a two-frequency matrix-addressing system wherein said frequencies are such that the absolute values of the dielectric anisotropy of said liquid crystal material at said two frequencies are sufficiently close to each other that the contrast of the display is not adversely affected by having a large number of lines in the system.

A significant object of the present invention is a liquid crystal display driven by a two-frequency matrix-addressing system wherein a dichroic dye is dissolved in said liquid crystal material in a guest-host relationship.

Still other objects and advantages of the invention will in part be obvious and will in part be apparent from the specification.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Liquid crystal display elements are now being widely used for digital display in items such as electronic calculators and wristwatches. The type of display element with which the present invention is concerned is that which functions in the twisted nematic mode, hereinafter referred to as the TN mode; the construction of such display cells is well known to those skilled in the art and will not be discussed further except for the two-frequency matrix-addressing system of the present invention.

In the application of the digital display system to a situation in which the display has many picture cells, as is the case in an XY matrix display, it is a precondition to use the multiplex driving method in order to decrease the number of terminals which must be electrically connected with the driving circuit and to simplify the circuit itself. In addition, driving with alternating current is necessary in order to lengthen the life of the liquid crystal display elements; as a result, the multiplexed driving method which is now in common use is what is called the generalized AC amplitude selective multiplexing method.

Figure 1:
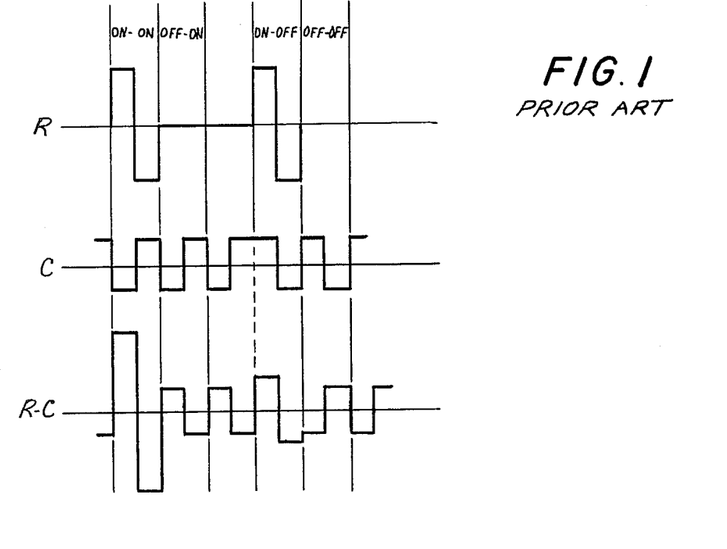
FIG. 1 is an example of the driving waveforms used in a conventional generalized AC amplitude selective-multiplexing system.

An example of the driving waveforms used in the generalized AC amplitude selective multiplexing method is shown in FIG. 1 wherein R is a timing signal, C is a data signal and the difference between the two signals, namely, R-C is supplied to the liquid crystal cell. The ratio of the value of the effective voltage, Von, in the selected condition to the effective voltage value, Voff, in the non-selected condition is largest when the voltage of R and the voltage of C is in the ratio $\sqrt{N}$:1 where N is the reciprocal of the duty ratio and corresponds to the number of driving lines in the XY matrix display. For this case, the following formula is obtained:

$$Von/Voff = \sqrt{\frac{\sqrt{N}+1}{\sqrt{N}-1}} \quad (1)$$

As can be seen from equation (1), the larger is the number of driving lines in the XY matrix display, the smaller is the ratio of Von/Voff.

Figure 2:
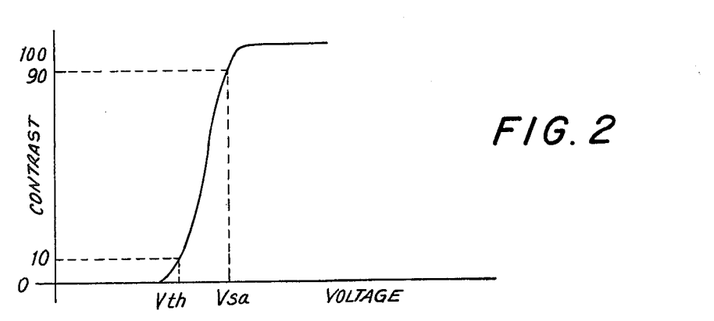
FIG. 2 shows the relation between the voltage and the contrast in a display operating in the twisted nematic (TN) mode.

The result in this decrease of the ratio becomes evident from a study of FIG. 2 which shows the relation between voltage and contrast in a liquid crystal display operating in the TN mode. In this Figure, Vth is the voltage at which the contrast is 10% of full saturation and Vsa is the voltage at which the contrast is 90% of full saturation. In devices operating in the TN mode, the ratio of Vsa to Vth is generally about 1.4 to 1.5. However, Von/Voff is equal to 1.4 when N=9, according to equation (1), as a result of which the effective voltage value in the non-selected condition is larger than Vth where N is larger than 10, and the effective voltage value in the selected condition is larger than Vsa so that a picture cell which should be in the non-selected, that is in the off condition, appears to be illuminated, that is in the on condition.

Conversely, if the effective voltage value in the non-selected condition is maintained at a level lower than Vth, then the effective voltage in the selected condition is smaller than Vsa so that sufficient contrast between a cell in the selected condition and a cell in the non-selected condition can not be obtained, the term "cell" in this context referring to a portion of the entire cell, said portion being under consideration.

As is evident from the above discussion, in multiplex driving of a large number of digits in accordance with conventional generalized AC amplitude-selective multiplexing, the contrast ratio of the picture cell, that is, selected elements to non-selected elements, is low. Furthermore, when the number of driving lines increases the contrast ratio becomes even smaller. The present invention has the object of eliminating the above disadvantages and of providing a liquid crystal display device which is almost completely unaffected as to contrast ratio even when N is greatly extended in number.

Figure 3:
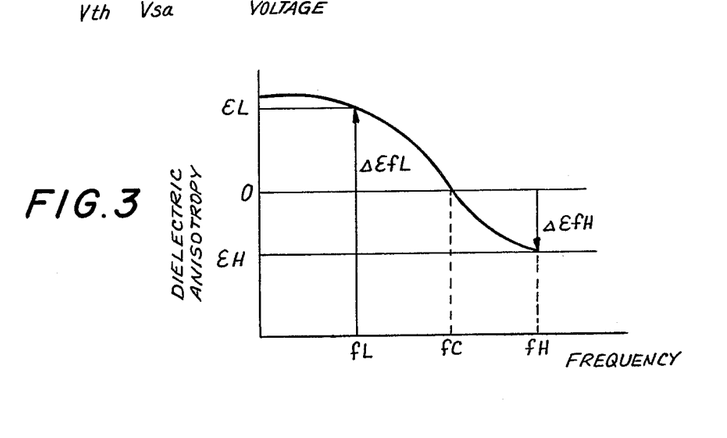
FIG. 3 shows the change in dielectric anisotropy of the liquid crystal component used in the present invention as the frequency is changed.

The present invention utilizes the phenomenon of change in the dielectric anisotropy of a liquid crystal material as the frequency imposed thereon is changed. Taking note of the fact that nematic liquid crystals are thread-like in shape and therefore have a major axis, $\epsilon \parallel$ is defined as the dielectric constant in the lengthwise direction of the liquid crystal molecule and $\epsilon \perp$ is defined as the transverse dielectric constant. In the liquid crystal material on which FIG. 3 is based, $\epsilon \parallel - \epsilon \perp > 0$, namely the dielectric anisotropy, is positive when the frequency is lower than the critical frequency fC at which $\epsilon \parallel$ is equal to $\epsilon \perp$. When the frequency is higher than the critical frequency fC, then $\epsilon \parallel - \epsilon \perp$ is less than 0 so that the dielectric anisotropy is then negative. The dielectric anisotropy is plotted on the ordinate of FIG. 3 as $\epsilon$. The expression $\Delta \epsilon fL$ then represents the dielectric anisotropy for the frequency fL which is lower than the critical frequency and the dielectric anisotropy for the frequency fL is positive. Similarly, the dielectric anisotropy for the frequency fH is $\Delta \epsilon fH$ which is negative for said high frequency.

Figure 4:
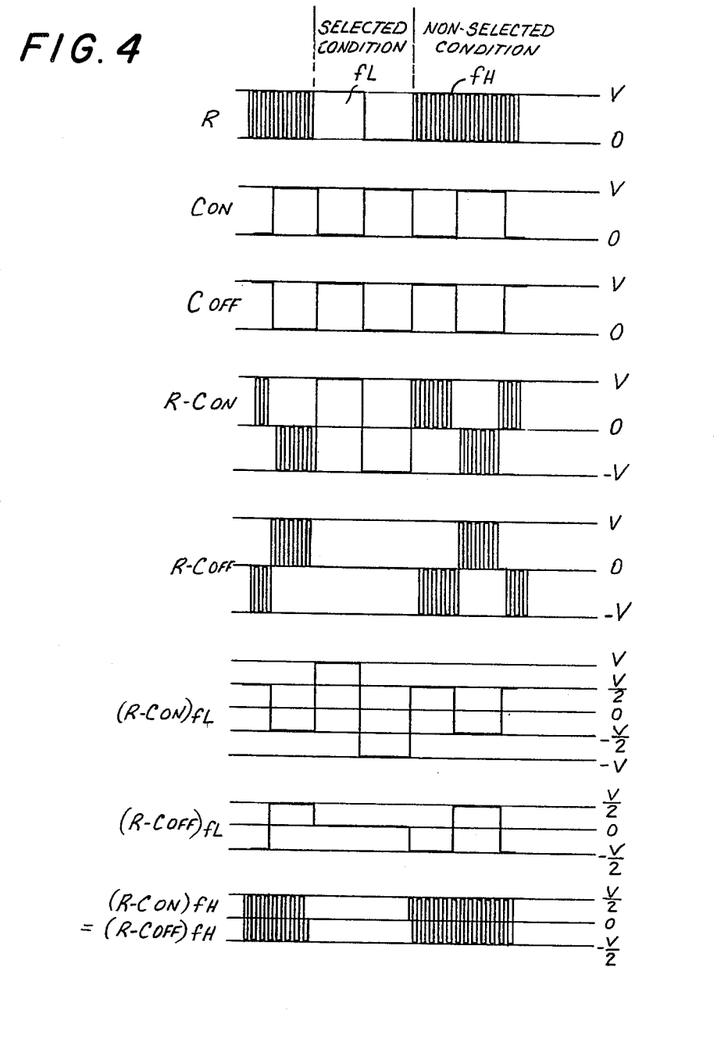
FIG. 4 is an example of the waveforms used in the two-frequency matrix-addressing system in accordance with the present invention wherein the low frequency is used for placing an element in selected condition and the high frequency is used for placing the element in non-selected condition.

It is this change in dielectric anisotropy with change in frequency which makes possible the present invention. The way in which this characteristic is utilized is shown in FIG. 4. A timing signal given the reference character R consists of a rectangular wave of low frequency for placing a picture element in on condition and of a high frequency wave for placing the picture element in off condition. It should be noted that the roles of the high and low frequency waves can be reversed and the way in which this is done will be described below. However, the derivation which follows immediately is based upon the definition of the components of timing signal R as shown in FIG. 4.

In the off or non-lighting condition, data signal wave C is in phase with the low frequency wave of the timing signal R in the selected condition as shown in the third line of FIG. 4 and given the designation of Coff. The situation is the converse for the on or lighting condition, the C wave then being 180° out-of-phase as shown by the second line in FIG. 4 indicated as Con. It is once more noted that the C signal is subtracted from the R signal. As a result, the waveform which is applied to a picture element in the lighting condition may be expressed as R-Con and the waveform applied to a picture element in the non-lighting condition may be expressed as R-Coff.

The two waves indicated as R-Con and R-Coff have a compound shape made up of both low and high frequencies. Analyzing these two waveforms for the separate components, the low-frequency component of R-Con may be expressed as (R-Con)fL and that of R-Coff may be expressed as (R-Coff)fL. The high-frequency components in both conditions are identical and may be expressed alternately as (R-Con)fH or (R-Coff)fH.

The effective voltage of the low-frequency component in the lighting condition is termed onVfL and is expressed as follows:

$$\text{on}V^2 fL = \frac{1}{N} V^2 + \frac{N-1}{N} \left(\frac{V}{2}\right)^2 \tag{2}$$

In equation 2, V is the peak value of the voltages of R and C.

The effective voltage value of the low-frequency component in the non-lighting condition is indicated as off VfL, the formula for said component being:

$$\text{off}V^2 fL = \frac{N-1}{N} \left(\frac{V}{2}\right)^2 \tag{3}$$

Taking note of the fact that the effective voltage of the high-frequency component of the timing signal is the same for both the on and off conditions, this value may be expressed as:

$$\text{on}V^2 fH = \text{off } V^2 fH = \frac{N-1}{N} \left(\frac{V}{2}\right)^2 \tag{4}$$

The effective voltage values of the low-frequency components during the on and off periods provide the power by which the liquid crystal molecules are positioned perpendicular to the faces of the cell and the effective voltage values of the high frequency component during the on and off periods provide the power by which the liquid crystal molecules are positioned parallel to the faces of the cell. The value of the power consumption is proportional both to the value of the dielectric anisotropy and to the square of the voltage. Accordingly, the power applied to the liquid crystal molecules during the on condition may be written as follows:

$$\Delta\epsilon \text{on}V^2 = \Delta\epsilon fL \, \text{on}V^2 fL + \Delta\epsilon fH \text{on}V^2 fH$$
$$= \Delta\epsilon fL \left\{ \text{on}V^2 fL + \frac{\Delta\epsilon fH}{\Delta\epsilon fL} \text{on}V^2 fH \right\} \tag{5}$$

The power applied to the molecules during the off condition may be expressed as follows:

$$\Delta\epsilon \text{off}V^2 = \Delta\epsilon fL \, \text{off}V^2 fL = \Delta\epsilon fH \, \text{off}V^2 fH$$
$$= \Delta\epsilon fL \left\{ \text{off}V^2 fL + \frac{\Delta\epsilon fH}{\Delta\epsilon fL} \text{off}V^2 fH \right\} \tag{6}$$

However, the value of this power, so far as $\Delta\epsilon$ is concerned, is independent of frequency if the effective voltage values for the two frequencies are identical. In such case $\Delta\epsilon$ in equation (5) can be replaced by $\Delta\epsilon fL$ in equation (6) to convert it into the following:

$$\Delta\epsilon fL \, \text{on}V^2 = \Delta\epsilon fL \left( \text{on}V^2 fL + \frac{\Delta\epsilon fH}{\Delta\epsilon fL} \text{on}V^2 fH \right) \tag{6a}$$

Dividing equation (6a) by $\Delta\epsilon fL$, the following equation is obtained:

$$\text{on}V^2 = \text{on}V^2 fL + \frac{\Delta\epsilon fH}{\Delta\epsilon fL} \text{on}V^2 fH \tag{7}$$

Equation (7) shows the effective voltage value for the on condition in terms of the dielectric anisotropies corresponding to the high and low frequencies. Eliminating $\Delta\epsilon$ from equation (6) in the same way in which the term was eliminated from equation (5), results in the following equation:

$$\text{off}V^2 = \text{off}V^2 fL + \frac{\Delta\epsilon fH}{\Delta\epsilon fL} \text{off}V^2 fH \tag{8}$$

Substituting equations (2) and (4) into equation (7), the following formula for the on voltage is obtained:

$$\text{on}V^2 = \frac{1}{N} V^2 + \frac{N-1}{N} \left(\frac{V}{2}\right)^2 + \frac{\Delta\epsilon fH}{\Delta\epsilon fL} \frac{N-1}{N} \left(\frac{V}{2}\right)^2 \tag{9}$$

Similarly, substituting equations (3) and (4) into equation (8), the following equation is obtained:

$$\text{off}V^2 = \frac{N-1}{N} \left(\frac{V}{2}\right)^2 = \frac{\Delta\epsilon fH}{\Delta\epsilon fL} \frac{N-1}{N} \left(\frac{V}{2}\right)^2 \tag{10}$$

Combining equations (9) and (10), the following formula is obtained:

$$\frac{\text{on}V}{\text{off}V} = \sqrt{\frac{4 + (N-1)\left(1 + \frac{\Delta\epsilon fH}{\Delta\epsilon fL}\right)}{(N-1)\left(1 + \frac{\Delta\epsilon fH}{\Delta\epsilon fL}\right)}} \tag{11}$$

Taking note of the fact that $\Delta\epsilon fH$ is a negative number and $\Delta\epsilon fL$ is a positive number, the ratio of these two quantities may be defined as follows:

$$\frac{\Delta\epsilon fH}{\Delta\epsilon fL} = -a, \text{ where } a \text{ is greater than } 0. \tag{12}$$

Substituting equation (12) into equation (11), the following equation is obtained:

$$\frac{\text{on}V}{\text{off}V} = \sqrt{\frac{4 + (N-1)(1-a)}{(N-1)(1-a)}} \tag{13}$$

Equation (13) provides the ratio of the effective voltage values for the selected condition and the non-selected condition where the display device is controlled by two frequencies applied as shown in FIG. 4. As can be seen from equation (13), the ratio onV/offV $\to \infty$ when $a \to 1$, from which it can be seen that the value of this last ratio can be set at any desired level independently of the size of N if the value of a is suitably selected. It can therefore be concluded that a sufficient contrast ratio for a picture cell in the on condition relative to the off condition can be obtained by suitably controlling the value of a regardless of increase in the size of N. Accordingly, by suitable selection of the two frequencies used to control the liquid crystal composition in the display cell, the loss of contrast attendant upon increase in the size of N in conventional two-frequency addressing systems can be completely avoided.

A liquid crystal display device in accordance with the present invention comprises at least the liquid crystal display element for operation in the TN mode and the driving circuitry of the two-frequency matrix-addressing system. A liquid crystal component or composition which has the frequency dependence of the dielectric anisotropy as shown in FIG. 3 is used as a liquid crystal display element. Generally, liquid crystal materials for which the dielectric anistropy is positive in the low-frequency domain and negative in the high-frequency domain have a characteristic curve such as that shown in FIG. 3. Also, the value of the critical frequency fC is generally in the range of several hundreds of kilohertz to several megahertz. Although such a liquid crystal composition can be used in a liquid crystal display device in accordance with the present invention, where the frequency is so high, the driving circuitry becomes difficult to construct, especially in small size. Consequently, it is desirable that the critical frequency of the liquid crystal composition be within the range of several KHz to several dozens of KHz, or, more specifically, from about 5 KHz to about 75 KHz. A liquid crystal material which satisfies the above condition is, for example, that sold by Merck & Company under the name Nematic Phase 1085 TNC.

Although FIG. 4 provides a specific example of driving waveforms, it is, of course, not the only acceptable driving waveform. It is only essential that the frequency of the low-frequency component be lower than fC and that the frequency of a high-frequency component be higher than said fC. Thus, although rectangular waves are most convenient for operation of the present invention, other waveforms can also be used. In addition, the high-frequency component can be used for selecting the on and off conditions of the display.

The use of the high-frequency component for controlling the on and off condition of the display is particularly advantageous where the liquid crystal composition is of the Guest-Host type which comprises a dichroic dye dissolved in the liquid crystal material, such a dye being transparent when viewed from one direction and colored when viewed from another. In the absence of the high frequency signal, the dielectric anisotropy of the composition is positive so that the liquid crystal molecules are aligned perpendicularly with respect to the walls of the cell; the molecules of dye are also aligned in the same directions and the cell is then in the transparent condition. When the high-frequency electric field is applied, the dielectric anisotropy of the liquid crystal molecules becomes negative and the molecules are aligned in directions parallel to the walls of the cell, the dye molecules also being aligned similarly so that the cell is then in colored condition.

Figure 5:
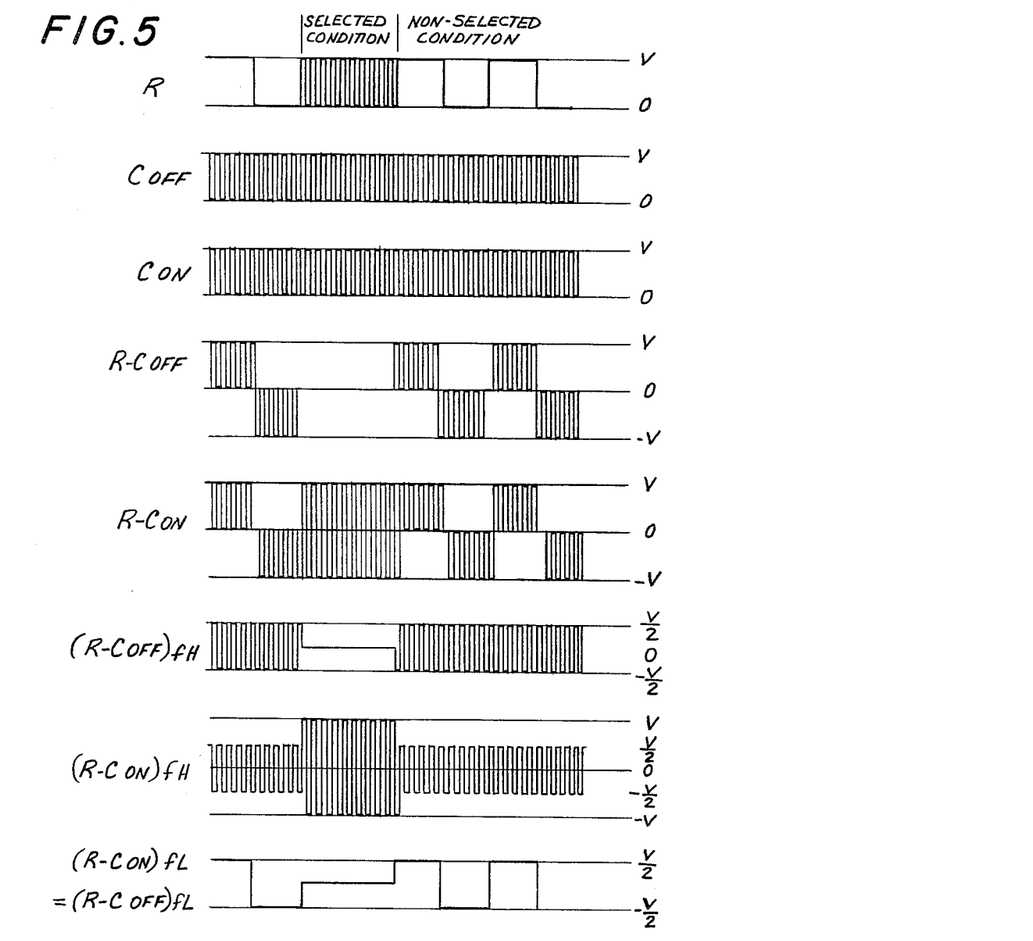
FIG. 5 is a Figure analogous to FIG. 4 but in which the roles of the two frequencies are reversed from those of FIG. 4.

In this embodiment of the invention, colored patterns are displayed against a transparent background. This is contrary to the conventional method in which transparent patterns are displayed against a colored background. The contrast produced by a device in accordance with the present invention is much more clearly visible to the eye than is the device operating in the conventional mode. As shown in FIG. 5, R is a timing signal in which the rectangular wave of high frequency is applied in the selected condition and a wave of low frequency is applied in the non-selected condition. C is a data signal and in the lighting condition said data signal is 180° out-of-phase with the high-frequency wave of the timing signal in the selected condition as is shown by the line indicated by the reference character Con. Considering then the non-selected condition, the rectangular wave is in phase with the high-frequency wave as shown in the line having the reference character Coff. The waveform applied to the picture cell in the on condition may be expressed as R-Con, and the waveform applied to the picture cell in the off condition may be expressed as R-Coff. These two waves have a shape compounded of the high-frequency and the low-frequency components. If the waves are analyzed into these components, the high-frequency component of R-Con may be expressed as (R-Con)fH and the high-frequency component of R-Coff may be expressed as (R-Coff)fH, these components being shown in FIG. 5. The low-frequency components in each case are identical and may be expressed either as (R-Con)fL of (R-Coff)fL as indicated in the last line of FIG. 5.

Taking note, then, that in this embodiment of the invention, the high-frequency component is used for selecting the condition of the display element, the effective voltage value for placing the display elements in the on or lighting condition may be defined as follows:

$$\text{on}V^2fH = \frac{1}{N}V^2 + \frac{N-1}{N}(\frac{V}{2})^2 \quad (14)$$

Then, indicating the effective voltage value of the high-frequency component in the non-lighting condition as offVfH, the following equation is obtained:

$$\text{off}V^2fL = \frac{N-1}{N}(\frac{V}{2})^2 \quad (15).$$

The effective voltage value of the low-frequency component is the same both in the on and in the off condition and may be expressed as follows:

$$\text{on}V^2fL = \text{off}V^2fL = \frac{N-1}{N}(\frac{V}{2})^2 \quad (16).$$

Note is now taken of the fact that the high frequency in FIG. 5 corresponds to fH in FIG. 3 and that the low frequency corresponds to fL in the same Figure. Then, the effective voltage value of high frequency onVfH and offVfH provide the power by which the liquid crystal molecules are positioned parallel to the cell walls and the corresponding effective voltages onVfl and offVfL for the low frequency component provide the power by which the liquid crystal molecules are positioned perpendicularly to the cell walls. The power required for ordering the molecules is proportional to the dielectric anisotropy and to the square of the voltage. Taking the applied power for placing the liquid crystal molecules in the parallel position to be negative and the applied power for aligning the liquid crystal molecules perpendicularly to be positive, the power provided to the molecules in the on condition can be expressed as follows:

$$\Delta\epsilon\, \text{on}V^2 = \Delta\epsilon fH\, \text{on}V^2 fH + \Delta\epsilon fL\, \text{on}V^2 fL \qquad (16a)$$

$$\Delta\epsilon\, \text{on}V^2 = \Delta\epsilon fH\left(\text{on}V^2 fH + \frac{\Delta\epsilon fL}{\Delta\epsilon fH}\, \text{on}V^2 fL\right) \qquad (17)$$

The power provided to the cell or to cell elements in the off condition may be written as follows:

$$\Delta\epsilon\, \text{off}V^2 = \Delta\epsilon fH\left(\text{off}V^2 fL + \frac{\Delta\epsilon fL}{\Delta\epsilon fH}\, \text{off}V^2 fL\right) \qquad (18)$$

The power provided to the molecules is dependent only on $\Delta\epsilon$ and is independent of frequency provided that the effective voltage is constant. Consequently, when the dielectric anisotropy is converted into that of the high frequency in equation (17), $\Delta\epsilon$ can be expressed as $\Delta\epsilon fH$, so that equation (17) can be rewritten as follows:

$$\Delta\epsilon fH\, \text{on}V^2 = \Delta\epsilon fH\left(\text{on}V^2 fH + \frac{\Delta\epsilon fL}{\Delta\epsilon fH}\, \text{on}V^2 fL\right) \qquad (18a)$$

From equation (18a) the following is derived:

$$\text{on}V^2 = \text{on}V^2 fH + \frac{\Delta\epsilon fL}{\Delta\epsilon fH}\, \text{on}V^2 fL \qquad (19)$$

Equation (19) shows the effective voltage value in the on condition when the dielectric anisotropy is expressed in terms of that for high frequency. In a similar manner, the following equation (20) is derived from equation (18) which gives the effective voltage value in the non-lighting condition:

$$\text{off}V^2 = \text{off}V^2 fH + \frac{\Delta\epsilon fL}{\Delta\epsilon fH}\, \text{off}V^2 fL \qquad (20)$$

Substituting equations (14), (15) and (16) into equations (19) and (20), the following equations (21) and (22) are obtained:

$$\text{on}V^2 = \frac{1}{N}V^2 + \frac{N-1}{N}\left(\frac{V}{2}\right)^2 + \frac{\Delta\epsilon fL}{\Delta\epsilon fH}\cdot\frac{N-1}{N}\left(\frac{V}{2}\right)^2 \qquad (21)$$

$$\text{off}V^2 = \frac{N-1}{N}\left(\frac{V}{2}\right)^2 + \frac{\Delta\epsilon fL}{\Delta\epsilon fH}\cdot\frac{N-1}{N}\left(\frac{V}{2}\right)^2 \qquad (22)$$

Equation (23) is derived from equations (21) and (22):

$$\frac{\text{on}V}{\text{off}V} = \sqrt{\frac{4 + (N-1)\left(1 + \frac{\Delta\epsilon fL}{\Delta\epsilon fH}\right)}{(N-1)\left(1 + \frac{\Delta\epsilon fL}{\Delta\epsilon fH}\right)}} \qquad (23)$$

Taking note of the fact that $\Delta\epsilon fH$ is a negative number and $\Delta\epsilon fL$ is a positive number the relation therebetween may be written as follows:

$$\frac{\Delta\epsilon fL}{\Delta\epsilon fH} = -a \quad (a > 1) \qquad (24)$$

Substituting equation (24) into equation (23), the following equation is obtained:

$$\frac{\text{on}V}{\text{off}V} = \sqrt{\frac{4 + (N-1)(1-a)}{(N-1)(1-a)}} \qquad (25)$$

As will be noted, equation (25) is identical with equation (13) despite the fact that in this embodiment of the invention it is the high-frequency component which is used for selection. Moreover, the comments made above with respect to absence of degradation of contrast when the number of lines in the system is increased apply to this embodiment as well.

The same considerations which apply to the selection of the liquid crystal material in the first embodiment also apply to this second embodiment in which a dichroic dye is dissolved in a host. The product sold by Merck and Company under the name of Nematic Phase 1085 TNC may also be used in combination with any effective dichroic dye.

Figure 6:
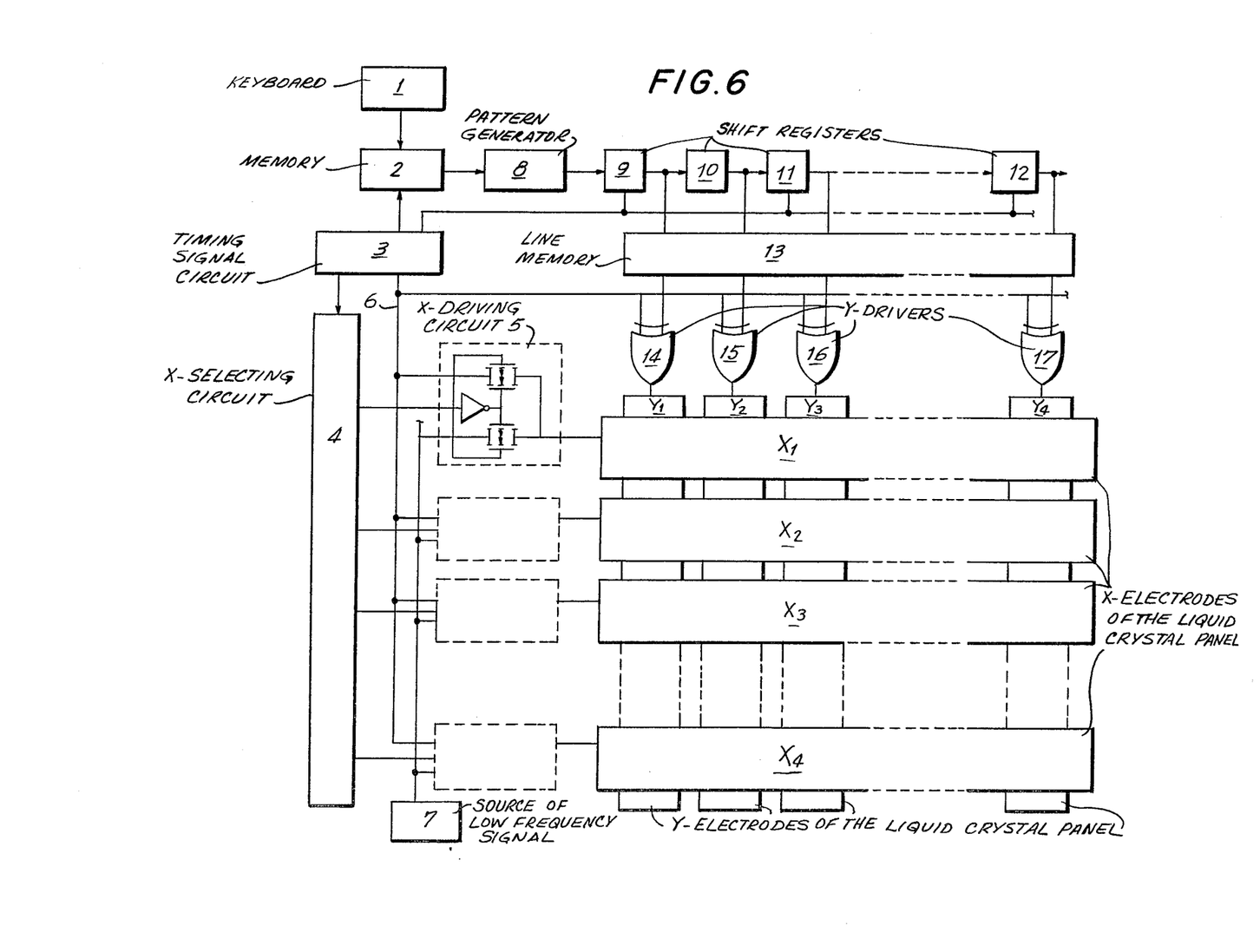
FIG. 6 is a block diagram of the character-display means of the present invention.

The circuitry for an XY matrix display device in accordance with the present invention is shown in FIG. 6, said circuitry including a keyboard 1, the information inserted by means of said keyboard being stored in memory 2. The circuit further includes timing signal circuit 3 and X-selecting circuit 4 which is driven in accordance with the signal from timing circuit 3. The circuitry will further be described in terms of the high-frequency component being used for selection, it being well understood by those skilled in the art how the device is to be used for selection by means of the low-frequency component. Thus, according to the signal from X-selecting circuit 4, X-driving circuit 5 applies a high-frequency signal 6 from timing circuit 3 to an electrode $X_1$ in the selected condition and the signal from the low-frequency signal source 7 to the electrode $X_1$ in the non-selected condition.

Once the data inserted into the system through keyboard 1 are memorized in memory 2, the data are transmitted to pattern generator 8 and transduced into a character-pattern signal therein, and the signal is transmitted to shift registers 9, 10, 11, . . . 12 in sequence. The contents of said shift registers are transmitted to line memory 13 and the contents of line memory 13 are transmitted to the driving circuits 14, 15, 16, . . . 17, during the scanning of a single line.

Y-driving circuits 14, 15, 16 . . . 17 transduce the contents of line memory 13 into the signal which is 180° out-of-phase with high-frequency signal 6 in the selected condition and in phase with high-frequency signal in the non-selected condition and the signals are then sent to the Y-electrode.

The present invention makes it possible to provide an XY matrix display with a two-frequency matrix-addressing system in which either a low-frequency or a high-frequency signal is used for making the selection of whether a picture element is on or off. Moreover, the display has a high contrast which is essentially independent of the number of lines in the system and makes possible a display in which transparent picture elements are shown against a colored background or colored picture elements are shown against a transparent background, the latter embodiment being preferred because of higher visibility. Also, a critical property of a liquid crystal material to be employed in the device is pointed out, namely that the frequency at which the dielectric anisotropy changes from positive to negative should be selected to lie within a certain range so that the construction of the device is simplified and facilitated. Furthermore, it is pointed out that the two frequencies used in the system should correspond to two dielectric anisotropies, the absolute values of which should have a ratio sufficiently close to 1 so that the contrast ratio of the device is essentially independent of the number of lines in the circuit and in the display.

It will thus be seen that the objects set forth above, among those made apparent from the preceding description, are efficiently attained, and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention, which, as a matter of language, might be said to fall therebetween.

What is claimed is:

1. A liquid crystal display device for operation in the twisted nematic mode comprising:
    a cell for holding a liquid crystal material, said cell including picture elements in matrix array;
    a nematic liquid crystal material in said cell, said material having a dielectric anisotropy sensitive to the frequency of an alternating electric field imposed thereupon, said anisotropy being positive for frequencies below a critical frequency, fC, characteristic of said material and negative for frequencies greater than fC; and
    matrix addressing means connected with said cell for supplying thereto a timing signal and data signal, said timing signal consisting of a component of frequency fL and a component of frequency fH, fL being lower than fC and fH being higher than fC, said data signal consisting of one of said components, which, selectively is in phase with said one of said timing signal components for placing a picture element in off condition and 180° out-of-phase with said timing signal component for placing said picture element in on condition, for subtracting said data signal from said timing signal, and for supplying the difference to selected elements in said cell for changing the sign of a dielectric anisotropy of the liquid crystal material therein and for thereby selecting the condition of said picture element.

2. The liquid crystal display device as claimed in claim 1, wherein said matrix-addressing means is arranged and constructed for supplying high and low frequency components at frequency values such that the contrast of said device is essentially independent of the number of lines in said matrix, said independence being achieved when the value of the ratio $|\Delta\epsilon fH/\Delta\epsilon fL|$ is sufficiently close to 1, the numerator and denominator of said ratio being the absolute values of the changes in said dielectric anisotropy corresponding respectively to fH and fL.

3. The liquid crystal display device as claimed in claim 1, wherein said component of low frequency is said timing signal component.

4. The liquid crystal display device as claimed in claim 1, wherein said component of high frequency is said timing signal component.

5. The liquid crystal display device as claimed in claim 4, wherein a dichroic dye is contained in said liquid crystal material in guest-host relation.

6. The liquid crystal display device as claimed in claim 1, wherein said liquid crystal material is selected to have a critical frequency fC between about 5 KHz and 75 KHz.

* * * * *